(12) United States Patent
Wang (10) Patent No.: US 12,307,913 B2
(45) Date of Patent: May 20, 2025

(54) METHOD AND SYSTEM FOR GUIDING LANDING OF UNMANNED AERIAL VEHICLE, AUXILIARY POSITIONING SYSTEM, AND UNMANNED AERIAL VEHICLE

(71) Applicant: BEIJING SANKUAI ONLINE TECHNOLOGY CO., LTD., Beijing (CN)

(72) Inventor: Jinjin Wang, Beijing (CN)

(73) Assignee: BEIJING SANKUAI ONLINE TECHNOLOGY CO., LTD., Beijing (CN)

( * ) Notice: Subject to any disclaimer, the term of this patent is extended or adjusted under 35 U.S.C. 154(b) by 218 days.

(21) Appl. No.: 18/054,467

(22) Filed: Nov. 10, 2022

(65) Prior Publication Data

US 2023/0068389 A1 Mar. 2, 2023

Related U.S. Application Data

(63) Continuation of application No. PCT/CN2021/093144, filed on May 11, 2021.

(30) Foreign Application Priority Data

May 12, 2020 (CN) .......................... 202010399341.6

(51) Int. Cl.
*G08G 5/54* (2025.01)
*B64U 70/00* (2023.01)
(Continued)

(52) U.S. Cl.
CPC .............. *G08G 5/54* (2025.01); *B64U 70/00* (2023.01); *G08G 5/55* (2025.01); *G08G 5/57* (2025.01)

(58) Field of Classification Search
CPC ........ G08G 5/025; G08G 5/0069; G08G 5/54; G08G 5/55; G08G 5/57; B64U 70/00
(Continued)

(56) References Cited

U.S. PATENT DOCUMENTS

| 2015/0051758 A1* | 2/2015 | Cho ...................... G05D 1/0676 |
| | | 701/16 |
| 2016/0068264 A1 | 3/2016 | Ganesh et al. |

(Continued)

FOREIGN PATENT DOCUMENTS

| CN | 103226356 A | 7/2013 |
| CN | 106774321 A | 5/2017 |

(Continued)

OTHER PUBLICATIONS

Extended European Search Report Communication Pursuant to Rule 62 EPC, dated Aug. 8, 2023 in Patent Application No. EP21803437.9, which is a foreign counterpart application related to this application.

(Continued)

*Primary Examiner* — Isaac G Smith
(74) *Attorney, Agent, or Firm* — Kolitch Romano Dascenzo Gates LLC (57) ABSTRACT

The disclosure relates to a method for guiding landing of an unmanned aerial vehicle. The method for guiding landing of unmanned aerial vehicle includes: determining location information of the unmanned aerial vehicle over a target airdrome by using a plurality of position detectors in an airdrome auxiliary positioning system; generating correction guidance information according to an offset vector between the location information and target location information, where the target location information is information representing any location within signal coverage of a guidance beacon of the target airdrome; and sending the correction (Continued)

---

Determine location information of an unmanned aerial vehicle over a target airdrome by using a plurality of position detectors in an airdrome auxiliary positioning system — S11

Generate correction guidance information according to an offset vector between the location information and target location information, where the target location information is information representing any location within signal coverage of a guidance beacon of the target airdrome — S12

Send the correction guidance information to the unmanned aerial vehicle, where the correction guidance information is used to guide the unmanned aerial vehicle to fly into the signal coverage of the guidance beacon — S13 guidance information to the unmanned aerial vehicle, where the correction guidance information is used to guide the unmanned aerial vehicle to fly into the signal coverage of the guidance beacon.

13 Claims, 4 Drawing Sheets

(51) Int. Cl.
  *G08G 5/55* (2025.01)
  *G08G 5/57* (2025.01)
(58) Field of Classification Search
  USPC .............................................................. 701/3
  See application file for complete search history.

(56) References Cited

U.S. PATENT DOCUMENTS

| | | | | |
|---|---|---|---|---|
| 2017/0039862 | A1* | 2/2017 | Choi | G05D 1/046 |
| 2017/0286892 | A1* | 10/2017 | Studnicka | G06Q 20/3224 |
| 2018/0003792 | A1* | 1/2018 | McCafferty | G08G 1/0141 |
| 2018/0137767 | A1 | 5/2018 | Hou et al. | |
| 2018/0357909 | A1* | 12/2018 | Eyhorn | G08G 5/0069 |
| 2020/0017237 | A1 | 1/2020 | Walker et al. | |
| 2022/0019243 | A1* | 1/2022 | Villiers | G05D 1/0858 |

FOREIGN PATENT DOCUMENTS

| | | | |
|---|---|---|---|
| CN | 107202982 | A | 9/2017 |
| CN | 107272028 | A | 10/2017 |
| CN | 107402396 | A | 11/2017 |
| CN | 107820215 | A | 3/2018 |
| CN | 108001694 | A | 5/2018 |
| CN | 108074420 | A | 5/2018 |
| CN | 108945491 | A | 12/2018 |
| CN | 108983807 | | 12/2018 |
| CN | 109085851 | A | 12/2018 |
| CN | 109407687 | A | 3/2019 |
| CN | 109911237 | A | 6/2019 |
| CN | 110244770 | A | 9/2019 |
| CN | 110703201 | A | 1/2020 |
| CN | 110879617 | A | 3/2020 |
| CN | 111123964 | A | 5/2020 |
| JP | 2021046110 | A | 3/2021 |
| KR | 101724581 | B1 | 4/2017 |
| KR | 20190137398 | A | 12/2019 |

OTHER PUBLICATIONS

International Search Report of the International Searching Authority for State Intellectual Property Office of the People's Republic of China in PCT application No. PCT/CN2021/093144 issued on Aug. 18, 2021, which is an International application to which this application claims priority.

The State Intellectual Property Office of People's Republic of China, First Office Action in Patent Application No. CN202010399341.6 issued on Aug. 25, 2022, which is a foreign counterpart application corresponding to this U.S. Patent Application, to which this application claims priority.

* cited by examiner

METHOD AND SYSTEM FOR GUIDING LANDING OF UNMANNED AERIAL VEHICLE, AUXILIARY POSITIONING SYSTEM, AND UNMANNED AERIAL VEHICLE

CROSS REFERENCE TO RELATED APPLICATION

This application is a continuation application of international application No. PCT/CN2021/093144, filed on May 11, 2021, which claims priority to Chinese Patent Application No. 202010399341.6, filed on May 12, 2020 and entitled "METHOD AND SYSTEM FOR GUIDING UNMANNED AERIAL VEHICLE LANDING, AUXILIARY POSITIONING SYSTEM, AND UNMANNED AERIAL VEHICLE", the disclosures of which are herein incorporated by reference in their entireties.

TECHNICAL FIELD

The disclosure relates to the field of unmanned aerial vehicle technologies, and specifically to a method and system for guiding landing of an unmanned aerial vehicle, an auxiliary positioning system and an unmanned aerial vehicle.

BACKGROUND

In recent years, as unmanned aerial vehicles have been developed to be intelligent and autonomous, people have used unmanned aerial vehicles to complete tasks such as cargo distribution, automatic inspection, and automatic spraying of pesticides or disinfection water. The concept of unmanned aerial vehicle airdrome is proposed, and the unmanned aerial vehicle airdrome refers to a place where the unmanned aerial vehicle takes off or lands.

SUMMARY

The purpose of the disclosure is to provide a method and system for guiding landing of an unmanned aerial vehicle, an auxiliary positioning system and an unmanned aerial vehicle.

According to some embodiments of the disclosure, a method for guiding landing of an unmanned aerial vehicle is provided, including: determining location information of the unmanned aerial vehicle over a target airdrome by using a plurality of position detectors in an airdrome auxiliary positioning system; generating correction guidance information according to an offset vector between the location information and target location information, where the target location information is information representing any location within signal coverage of a guidance beacon of the target airdrome; and sending the correction guidance information to the unmanned aerial vehicle, where the correction guidance information is used to guide the unmanned aerial vehicle to fly into the signal coverage of the guidance beacon.

According to some embodiments of the disclosure, a method for guiding landing of an unmanned aerial vehicle is provided; the method is applied to the unmanned aerial vehicle and includes: receiving correction guidance information, where the correction guidance information is generated by an airdrome auxiliary positioning system of a target airdrome; flying into signal coverage of a guidance beacon of the target airdrome according to the correction guidance information; and landing to the target airdrome according to the guidance beacon.

According to some embodiments of the disclosure, an airdrome auxiliary positioning system is provided, including: a position detector, configured to determine location information of an unmanned aerial vehicle over a target airdrome; a controller connected to the position detector, configured to generate correction guidance information according to an offset vector between the location information and target location information, where the target location information is information representing any location within signal coverage of a guidance beacon of the target airdrome; and a communication interface connected to the controller, configured to send the correction guidance information to the unmanned aerial vehicle, where the correction guidance information is used to guide the unmanned aerial vehicle to fly into the signal coverage of the guidance beacon.

According to some embodiments of the disclosure, an unmanned aerial vehicle is provided, including a processor and a memory configured to store instructions executable by the processor, where the processor executes the instructions to implement the method for guiding landing of an unmanned aerial vehicle as described in any one of the foregoing embodiments.

BRIEF DESCRIPTION OF THE DRAWINGS

The accompanying drawings are provided for further understanding of the disclosure and constitute a part of the specification, and explain the disclosure together with the following specific implementations, but do not constitute a limitation to the disclosure. In the accompanying drawings.

DETAILED DESCRIPTION

Specific implementations of the disclosure are described in detail below with reference to the accompanying drawings. It should be understood that the specific implementations described herein are merely used for describing and illustrating the disclosure rather than limiting the disclosure.

Exemplary embodiments are described in detail herein, and examples of the embodiments are shown in the accompanying drawings. When the following description involves the accompanying drawings, unless otherwise indicated, the same numerals in different accompanying drawings represent the same or similar elements. The implementations described in the following embodiments do not represent all implementations that are consistent with the disclosure. On the contrary, the implementations are merely examples of apparatuses and methods that are described in detail in the appended claims and that are consistent with some aspects of the disclosure.

In the related art, an unmanned aerial vehicle receives scheduled route information issued by a cloud scheduling system, where the scheduled route information at least includes location information of a takeoff airdrome of the unmanned aerial vehicle and location information of a target airdrome for landing. The unmanned aerial vehicle navigates according to the scheduled route information, and performs precise landing based on a visual guidance technology after the unmanned aerial vehicle reaches the target airdrome, to complete the task of transporting goods to the target location.

An unmanned aerial vehicle executes a scheduled route based on real-time location information provided by a satellite navigation system. Satellite navigation systems include the Global Positioning System (GPS), Beidou satellite navigation system, Galileo satellite navigation system, global satellite navigation system and other systems, which are not limited in the present disclosure. For the sake of simplicity, the GPS is used as an example herein for description.

However, the unmanned aerial vehicle executes the scheduled route based on the real-time location information provided by the GPS, and the GPS location information of the unmanned aerial vehicle has a certain drift at different moments in the same place. Therefore, for the unmanned aerial vehicle, latitude and longitude information of the target airdrome acquired by the GPS may be different at different moments. Moreover, because the unmanned aerial vehicle performs precise landing based on the visual guidance technology, an initial position of the visual guidance needs to meet high requirements, and the drift of the GPS position can easily navigate the unmanned aerial vehicle beyond the predetermined initial range of the visual guidance. In other words, if the scheduled route information issued by the cloud scheduling system is out of date, the unmanned aerial vehicle cannot fly to the precise landing area of the target airdrome based on the scheduled route information, resulting in the failure of the delivery task.

In order to overcome the problem of GPS data drift, the location information of the target airdrome can be collected periodically manually, and then the scheduled route information can be manually updated according to the newly collected location information of the target airdrome. Although this method can overcome the problem of GPS data drift, it also has many other problems, such as high labor operation cost. Batch operation of the unmanned aerial vehicle delivery involves a large number of target airdromes. The scheme that relies periodic manual collection requires a large number of personnel to participate in the collection and update of location information, resulting in high operating costs for unmanned aerial vehicle delivery. In another example, the real-time performance of manually collecting the location information of the target airdrome on a regular basis is poor. The triggering of the unmanned aerial vehicle delivery task happens randomly, and the landing of the unmanned aerial vehicle may also occur at any time. Therefore, the method of manually collecting and updating the location information of the target airdrome on a regular basis cannot meet the randomness requirement of the unmanned aerial vehicle. In this way, the location data of the target airdrome may not be updated in time when the unmanned aerial vehicle is in the delivery stage, resulting in the failure of the unmanned aerial vehicle delivery. In another example, the method of manual collection and updating on a regular basis can be affected by human subjective factors. For example, an unskilled operator may fail to update waypoint data in time or make an update error, which further causes the failure of unmanned aerial vehicle delivery.

Further, in order to solve the problem of the failure of unmanned aerial vehicle delivery caused by a GPS data drift, the area of the unmanned aerial vehicle airdrome and signal coverage of a guidance beacon of the airdrome can be expanded, so that a target waypoint position of the unmanned aerial vehicle is still within the signal coverage of the guidance beacon of the target airdrome after the GPS data drift occurs. However, this method of expanding the area of the unmanned aerial vehicle airdrome and expanding the signal coverage of the guidance beacon not only wastes land resources but also increases the construction cost of the airdrome. Moreover, the expandability of this method is poor. If there is a higher performance requirement after the airdrome construction is finalized, the cost of the airdrome reconstruction is extremely high.

In view of this, the embodiments of the present disclosure provide a method and system for guiding landing of an unmanned aerial vehicle, an auxiliary positioning system and an unmanned aerial vehicle, to solve the problems in the related art.

To make it easier for those skilled in the art to understand the embodiments of the disclosure, the following briefly describes the unmanned aerial vehicle scheduling technology involved in the disclosure. It is not difficult to understand that an unmanned aerial vehicle scheduling system is used to uniformly schedule a plurality of unmanned aerial vehicles. When the unmanned aerial vehicle scheduling system schedules a plurality of unmanned aerial vehicles at the same time, in order to ensure the safety of the unmanned aerial vehicles, at least a safe distance is maintained between the unmanned aerial vehicles. Based on this, when a plurality of unmanned aerial vehicles need to land on the same target airdrome, the unmanned aerial vehicle scheduling system schedule the plurality of unmanned aerial vehicles to land on the target airdrome in sequence. That is, the unmanned aerial vehicle scheduling system does not allow a plurality of unmanned aerial vehicles to land on the target airdrome at the same time. When any one of the unmanned aerial vehicles is landing, other unmanned aerial vehicles to be landed need to queue up outside a preset safety area above the target airdrome for landing. For the sake of simplicity, the following description takes the unmanned aerial vehicle in the process of landing as an example.

Figure 1:
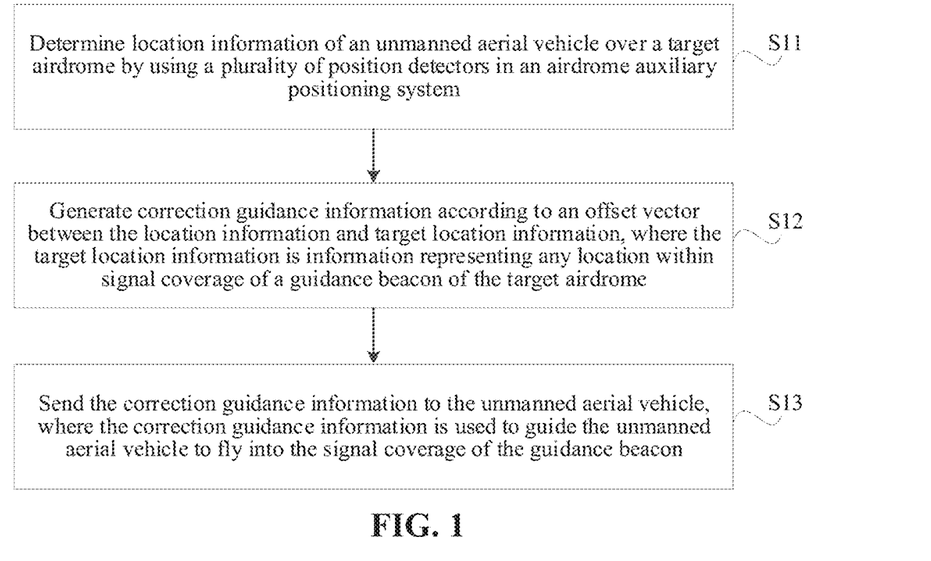
FIG. 1 is a flowchart of a method for guiding landing of an unmanned aerial vehicle according to an embodiment of the present disclosure.

FIG. 1 is a flowchart of a method for guiding landing of an unmanned aerial vehicle according to an embodiment of the present disclosure. The method can be applied to an airdrome auxiliary positioning system, and can further be applied to a system for guiding landing of an unmanned aerial vehicle including an airdrome auxiliary positioning system and a cloud scheduling system. As shown in FIG. 1, the method includes the following steps:

S11. Determine location information of the unmanned aerial vehicle over a target airdrome by using a plurality of position detectors in an airdrome auxiliary positioning system.

S12. Generate correction guidance information according to an offset vector between the location information and target location information, where the target location information is information representing any location within signal coverage of a guidance beacon of the target airdrome.

S13. Send the correction guidance information to the unmanned aerial vehicle, where the correction guidance information is used to guide the unmanned aerial vehicle to fly into the signal coverage of the guidance beacon.

In some embodiments, the position detector includes a millimeter wave radar. In another possible implementation, the position detector may further be a visual-based position detection device, or other position detection devices based on radio waves. For example, the position detector may be a camera, ultrasound detection device, an infrared detection device, or the like, which is not limited in the disclosure.

A general guidance beacon is an unmanned lighting device or other signal devices used for pilot navigation. In the disclosure, the guidance beacon refers to a navigation signal mark used to guide landing of the unmanned aerial vehicle, and the function thereof is similar to that of the navigation beacon used for pilot navigation.

It should be understood that guidance beacons, such as visual guidance beacons, are installed on (or around) an unmanned aerial vehicle airdrome to guide the unmanned aerial vehicle for precise landing. Correspondingly, a visual guidance beacon detection camera is installed on the unmanned aerial vehicle. In this way, the unmanned aerial vehicle can land precisely according to a signal of the airdrome guidance beacon detected by the visual guidance beacon detection camera.

In the related art, the unmanned aerial vehicle receives scheduled route information issued by a cloud scheduling system, where the scheduled route information at least includes location information of a takeoff airdrome of the unmanned aerial vehicle and location information of a target airdrome for landing. The unmanned aerial vehicle navigates according to the scheduled route information, and performs precise landing based on a visual guidance technology after the unmanned aerial vehicle reaches the target airdrome, to complete the task of transporting goods to the target location.

The unmanned aerial vehicle needs to be within a certain range over the airdrome to detect the signal of the guidance beacon of the airdrome. The range may be signal coverage of the guidance beacon, for example, a circular area with the guidance beacon as the center and a diameter of about several meters. However, if the scheduled route information issued is out of date, the problem of GPS data drift occurs. At this time, the location of the target airdrome in the scheduled route information issued by the cloud scheduling system may drift beyond the signal coverage of the guidance beacon of the target airdrome. In other words, when the scheduled route information expires, the unmanned aerial vehicle may not be able to navigate into the signal coverage of the guidance beacon of the target airdrome according to the scheduled route information issued by the cloud scheduling system. As a result, the unmanned aerial vehicle cannot detect the guidance beacon of the target airdrome, causing the unmanned aerial vehicle to fail to accurately land on the target airdrome.

Therefore, in a possible case, when the unmanned aerial vehicle arrives at a target airdrome location indicated in the scheduled route information, if the unmanned aerial vehicle cannot detect the signal of the guidance beacon of the target airdrome, the airdrome auxiliary positioning system of the target airdrome determines the location information of the unmanned aerial vehicle over the target airdrome by using the position detectors, generates correction guidance information according to the offset vector between the location information and the target location information, and then sends the correction guidance information to the unmanned aerial vehicle to guide the unmanned aerial vehicle to fly into the signal coverage of the guidance beacon. The target location information is information indicating any location within the signal coverage of the guidance beacon of the target airdrome. When the unmanned aerial vehicle navigates into the signal coverage of the guidance beacon of the target airdrome according to the correction guidance information, the unmanned aerial vehicle lands according to the detected guidance beacon, so as to accurately deliver goods to the target location. It is worth noting that a detection range of the position detector of the airdrome auxiliary positioning system is much larger than the signal coverage of the guidance beacon of the target airdrome, and when the location information of the target airdrome of the unmanned aerial vehicle has a GPS data drift, the range of the drift is limited. The detection range of the position detector of the airdrome auxiliary positioning system is configured to cover the location of the unmanned aerial vehicle with consideration on the range of GPS data drift.

In some situations, if the scheduled route information of the unmanned aerial vehicle expires when the unmanned aerial vehicle flies over the target airdrome according to the scheduled route information, the location information of the target airdrome in the scheduled route information has a GPS data drift. In this case, by using the foregoing technical solution of the present disclosure, location information of the unmanned aerial vehicle over a target airdrome is determined by using position detectors in an airdrome auxiliary positioning system of the target airdrome; correction guidance information is generated according to an offset vector between the location information and target location information, where the target location information is information representing any location within signal coverage of a guidance beacon of the target airdrome; and the correction guidance information is sent to the unmanned aerial vehicle, and after the unmanned aerial vehicle flies into the signal coverage of the guidance beacon of the target airdrome according to the correction guidance information, the unmanned aerial vehicle lands according to the guidance beacon, thereby solving the problem in the related art.

In some embodiments, the airdrome auxiliary positioning system includes a plurality of the position detectors symmetrically arranged with respect to a center position of the target airdrome. Accordingly, the step of determining location information of the unmanned aerial vehicle over a target airdrome by using the position detectors includes:
  obtaining relative distance information, detected by each of the position detectors, between each of the position detectors and the unmanned aerial vehicle over the target airdrome; and determining the location information of the unmanned aerial vehicle according to the relative distance information between each of the position detectors and the unmanned aerial vehicle.

Figure 2:
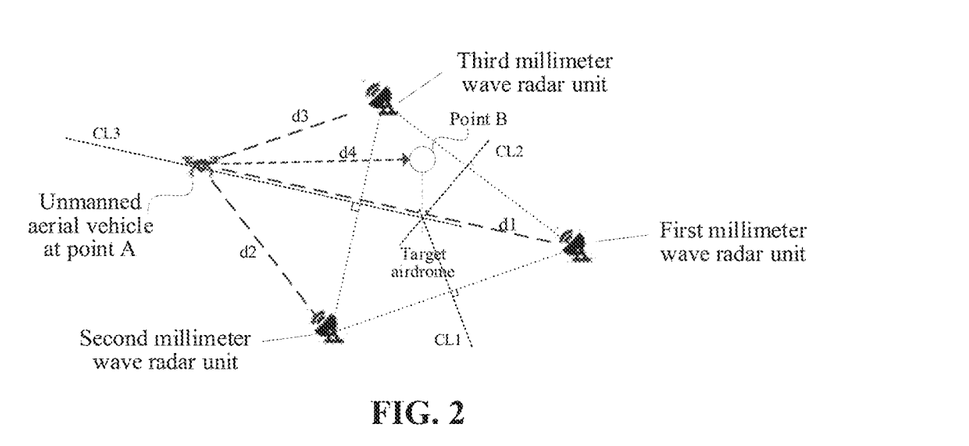
FIG. 2 is a schematic diagram showing the layout of millimeter wave radar units according to an embodiment of the present disclosure.

In some embodiments, referring to FIG. 2, FIG. 2 is a schematic diagram showing the layout of millimeter wave radar units according to an embodiment of the present disclosure. As shown in FIG. 2, if the unmanned aerial vehicle has a GPS data drift, the unmanned aerial vehicle is located at point A of the target airdrome location indicated in the scheduled route information. At this time, relative distance information d1, d2, and d3 between each millimeter wave radar unit and the unmanned aerial vehicle over the target airdrome is obtained through the three millimeter wave radar units shown in FIG. 2. Then, through calculation according to d1, d2, and d3, the location information of point A where the unmanned aerial vehicle is located can be determined.

In this way, the plurality of position detectors are symmetrically arranged with respect to the center position of the target airdrome, which facilitates data processing and can quickly determine the location information of the unmanned aerial vehicle. Moreover, in this way, the detectors are not required to have high directional accuracy. A better positioning effect can be achieved through the coordinated detection by the plurality of position detectors, and the relative location information can be obtained by calculation.

It should be understood that FIG. 2 is merely an exemplary case, which is not used to limit the present disclosure. The airdrome auxiliary positioning system of the disclosure includes a plurality of position detectors symmetrically arranged with respect to the center position of the target airdrome, where the quantity of the position detectors is configured according to actual requirements. For example, when the airdrome auxiliary positioning system is required to have higher performance, more position detectors are needed.

It should be further noted that, in addition to being symmetrically arranged with respect to the center position of the target airdrome, the position detectors may also be arranged in other ways. However, it is not difficult to understand that no matter how the position detectors are arranged, the relative distance information between the unmanned aerial vehicle and the position detectors can be determined based on calibrated positions of at least some of the plurality of position detectors.

In a possible implementation, after the GPS data drift occurs in the original target location information, a gap between the original target location information and the drifted location information is not particularly large. Therefore, when the location of the unmanned aerial vehicle is detected by using the position detectors, each position detector can be controlled to detect within a circular range with the original target location as the center and a drift distance as the radius. The drift distance can be calculated using prior data according to requirements. In this way, the detection range of the position detectors for the unmanned aerial vehicle can be reduced. Therefore, this method can improve the efficiency of detecting the location of the unmanned aerial vehicle by the position detectors. The foregoing description involves that the GPS data drift occurs in the location information of the target airdrome and the GPS data drift occurs in the original target location information. Therefore, the location information of the target airdrome is the original target location information, and a location of the target airdrome is an original target location. Therefore, each of the position detectors may be controlled to detect in a circular range with the target airdrome as a center and a drift distance as a radius. It can be known with reference to the foregoing description that, a position detector detects relative distance information between the position detector and the unmanned aerial vehicle over the target airdrome. Therefore, the obtaining relative distance information, detected by each of the position detectors, between each of the position detectors and the unmanned aerial vehicle over the target airdrome includes: controlling each of the position detectors to detect in a circular range with a location of the target airdrome as a center and a drift distance as a radius, to obtain the relative distance information between each of the position detectors and the unmanned aerial vehicle over the target airdrome.

In some embodiments, the correction guidance information is generated based on the offset vector between the location information and the target location information.

In some embodiments, referring to FIG. 2, if the target location information indicates that the target location is point B shown in FIG. 2, the correction guidance information is generated according to an offset vector (such as d4) between point A and point B. According to the correction guidance information, the unmanned aerial vehicle can navigate into the signal coverage of the guidance beacon of the target airdrome.

In another possible implementation, referring to FIG. 2, after d1 and d2 are determined, it is determined whether the unmanned aerial vehicle is located above a center line CL1 between a first millimeter wave radar unit and a second millimeter wave radar unit. A line segment is made with the positions of the two radar units as endpoints, a straight line is made perpendicularly to the line segment at the midpoint of the line segment, and the straight line is the center line of the two radar units. The two radar units may be symmetrical with respect to the center line. If d1 and d2 are equal, the unmanned aerial vehicle is above the center line CL1 between the first millimeter wave radar unit and the second millimeter wave radar unit. If d1 and d2 are not equal, the unmanned aerial vehicle is not above the center line CL1 between the first millimeter wave radar unit and the second millimeter wave radar unit. For example, if the unmanned aerial vehicle is not above the center line CL1 between the first millimeter wave radar unit and the second millimeter wave radar unit, the unmanned aerial vehicle is guided to fly to be above the center line CL1 between the first millimeter wave radar unit and the second millimeter wave radar unit. Further, after it is determined that the unmanned aerial vehicle is located above the center line CL1 between the first millimeter wave radar unit and the second millimeter wave radar unit, it is determined whether the unmanned aerial vehicle is located above a center line CL2 between the first millimeter wave radar unit and a third millimeter wave radar unit (or, it is determined whether the unmanned aerial vehicle is located above a center line CL3 between the second millimeter wave radar unit and the third millimeter wave radar unit). Further, the unmanned aerial vehicle is guided to fly along the center line CL1 between the first millimeter wave radar unit and the second millimeter wave radar unit to the center line CL2 between the first millimeter wave radar unit and the third millimeter wave radar unit (or, the unmanned aerial vehicle is guided to fly along the center line CL1 between the first millimeter wave radar unit and the second millimeter wave radar unit to the center line CL3 between the second millimeter wave radar unit and the third millimeter wave radar unit). Specifically, the difference between d1 and d3 (or the difference between d2 and d3) is decreased while d1 and d2 are kept equal, so that the unmanned aerial vehicle can also be guided into the signal coverage of the guidance beacon at point B.

The first millimeter wave radar unit, the second millimeter wave radar unit, and the third millimeter wave radar unit belong to different position detectors. Therefore, the disclosure may guide the unmanned aerial vehicle to center lines between different position detectors in sequence, so that the unmanned aerial vehicle flies into the signal coverage of the guidance beacon. It can be known according to the foregoing description that, the correction guidance information is used to guide the unmanned aerial vehicle to fly into the signal coverage of the guidance beacon. Therefore, the correction guidance information may be used to guide the unmanned aerial vehicle to center lines between different position detectors in sequence, so that the unmanned aerial vehicle flies into the signal coverage of the guidance beacon.

Therefore, the present disclosure does not limit the implementation of how to generate the correction guidance information according to the offset vector between the location information and the target location information. Alternatively, the determining location information of the unmanned aerial vehicle over a target airdrome by using a plurality of position detectors in an airdrome auxiliary positioning system includes:

determining the location information of the unmanned aerial vehicle over the target airdrome by using the plurality of position detectors in response to a positioning request sent by the unmanned aerial vehicle. The positioning request is generated and sent to the airdrome auxiliary positioning system by the unmanned aerial vehicle in a case that no signal of the guidance beacon is detected.

In some embodiments, the airdrome auxiliary positioning system generates a detection starting instruction in response to the positioning request, to instruct the position detector to turn on. Further, the location information of the unmanned aerial vehicle over the target airdrome is determined by using the position detectors. In a possible implementation, the positioning request is generated and sent to the airdrome auxiliary positioning system in a case that the unmanned aerial vehicle does not find the guidance beacon of the target airdrome after flying to the target airdrome location indicated in the scheduled route information without searching for.

In this way, when the unmanned aerial vehicle flies to the target airdrome location indicated in the scheduled route information, if the unmanned aerial vehicle cannot detect the signal of the guidance beacon of the target airdrome, it means that the scheduled route information of the unmanned aerial vehicle has expired. As a result, a GPS data drift occurs in the location information of the target airdrome. In this case, the unmanned aerial vehicle generates a positioning request, which is used to ask the target airdrome auxiliary positioning system to perform positioning. If the unmanned aerial vehicle can detect the signal of the guidance beacon of the target airdrome when arriving at the target airdrome location indicated in the scheduled route information, there is no need to turn on the auxiliary positioning system of the target airdrome. In this way, the auxiliary positioning system of the target airdrome is turned on as required, which can reduce energy consumption.

In another possible implementation, the detection starting instruction may be generated by the unmanned aerial vehicle in response to the positioning request, and sent to the airdrome auxiliary positioning system.

Alternatively, the determining the location information of the unmanned aerial vehicle over the target airdrome by using the plurality of position detectors in response to a positioning request sent by the unmanned aerial vehicle may further include: authenticating the unmanned aerial vehicle by using identity information in the positioning request when receiving the positioning request sent by the unmanned aerial vehicle; establishing a communication channel with the unmanned aerial vehicle after the authentication succeeds; and determining the location information of the unmanned aerial vehicle over the target airdrome by using the plurality of position detectors. The sending the correction guidance information to the unmanned aerial vehicle includes: sending the correction guidance information to the unmanned aerial vehicle through the communication channel established with the unmanned aerial vehicle.

In a possible implementation, if the positioning request is broadcast information sent by the unmanned aerial vehicle, the airdrome auxiliary positioning system can receive the broadcast information. When receiving the broadcast information, the airdrome auxiliary positioning system can authenticate the unmanned aerial vehicle according to the identity information carried in the broadcast, and after the verification succeeds, establish a communication channel with the unmanned aerial vehicle and generate a detection starting instruction at the same time. After the airdrome auxiliary positioning system generates the correction guidance information, the correction guidance information can be sent to the unmanned aerial vehicle through the communication channel.

In this way, after the communication channel is established between the unmanned aerial vehicle and the airdrome auxiliary positioning system, the unmanned aerial vehicle can communicate with the airdrome auxiliary positioning system, so that the unmanned aerial vehicle can directly obtain the correction guidance information generated by the airdrome auxiliary positioning system.

Alternatively, the sending the correction guidance information to the unmanned aerial vehicle includes:

sending the correction guidance information to a cloud scheduling system, so that the cloud scheduling system forwards the correction guidance information to the unmanned aerial vehicle.

It is not difficult to understand that if the airdrome auxiliary positioning system can directly send the correction guidance information to the unmanned aerial vehicle, a communication channel needs to be established between the two. If the airdrome auxiliary positioning system and the unmanned aerial vehicle need to communicate with each other, it is necessary to configure IP address information and identity authentication information of the unmanned aerial vehicle in the airdrome auxiliary positioning system. Correspondingly, a broadcast module and an IP address information of the airdrome auxiliary positioning system need to be configured on the unmanned aerial vehicle. In a possible case, if a large amount of unmanned aerial vehicle IP address information and identity authentication information of each unmanned aerial vehicle are stored in the airdrome auxiliary positioning system for numerous unmanned aerial vehicles, it consumes much memory of the airdrome auxiliary positioning system. In order to avoid this problem, in the disclosure, the correction guidance information generated by the airdrome auxiliary positioning system can be forwarded to the unmanned aerial vehicle through the cloud scheduling system of the unmanned aerial vehicle, so as to avoid the problem of high memory consumption caused by configuring a large amount of unmanned aerial vehicle IP address information in the airdrome auxiliary positioning system.

Figure 3:
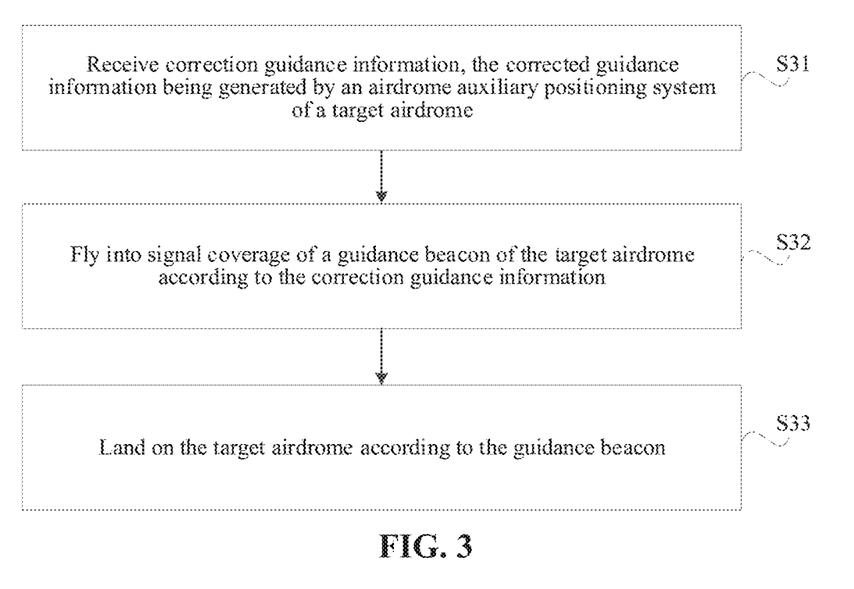
FIG. 3 is a flowchart of another method for guiding landing of an unmanned aerial vehicle according to an embodiment of the present disclosure.

FIG. 3 is a flowchart of another method for guiding landing of an unmanned aerial vehicle according to an embodiment of the present disclosure. The method is applied to an unmanned aerial vehicle. As shown in FIG. 3, the method may include the following steps:

S31. Receive correction guidance information, the correction guidance information being generated by an airdrome auxiliary positioning system of a target airdrome.

S32. Fly into signal coverage of a guidance beacon of the target airdrome according to the correction guidance information.

S33. Land on the target airdrome according to the guidance beacon.

In this way, if the unmanned aerial vehicle cannot detect a signal of the guidance beacon of the target airdrome when flying over a target airdrome location indicated in the scheduled route information, it means that the scheduled route information of the unmanned aerial vehicle has expired. As a result, a GPS data drift occurs in the location information of the target airdrome. In this case, the unmanned aerial vehicle receives the correction guidance information generated by the airdrome auxiliary positioning system of the target airdrome, and flies into the signal coverage of the guidance beacon of the target airdrome according to the correction guidance information. Further, after the unmanned aerial vehicle flies into the signal coverage of the guidance beacon of the target airdrome, the unmanned aerial vehicle can accurately and safely land on the target airdrome according to the detected guidance beacon.

Alternatively, before step S31, the method further includes:

the unmanned aerial vehicle navigates according to scheduled route information, where the scheduled route information is route information generated by a cloud scheduling system and used to guide the unmanned aerial vehicle to fly from a takeoff point to the target airdrome; the unmanned aerial vehicle switches from a flight mode to a landing mode and searches for the guidance beacon of the target airdrome, when it is detected by a satellite navigation system that the unmanned aerial vehicle arrives over the target airdrome; and the unmanned aerial vehicle generates a positioning request and sends the positioning request to the airdrome auxiliary positioning system of the target airdrome, in a case that the unmanned aerial vehicle does not find a signal of the guidance beacon.

In this way, the unmanned aerial vehicle switches from a flight mode to a landing mode and searches for the guidance beacon of the target airdrome when it is detected by GPS that the unmanned aerial vehicle arrives over the target airdrome. If the unmanned aerial vehicle cannot find the signal of the guidance beacon of the target airdrome, it means that the scheduled route information of the unmanned aerial vehicle has expired. As a result, a GPS data drift occurs in the location information of the target airdrome. In this case, the unmanned aerial vehicle generates a positioning request, and sends the positioning request to the airdrome auxiliary positioning system of the target airdrome, to instruct the auxiliary positioning system of the target airdrome to turn on. When the unmanned aerial vehicle detects that the unmanned aerial vehicle arrives above the target airdrome through the GPS, if the unmanned aerial vehicle can find the signal of the guidance beacon of the target airdrome, the unmanned aerial vehicle lands directly according to the detected signal of the guidance beacon without turning on the auxiliary positioning system of the target airdrome.

Alternatively, the sending the positioning request to the airdrome auxiliary positioning system of the target airdrome includes: sending the positioning request to a cloud scheduling system, so that the cloud scheduling system sends the positioning request to the airdrome auxiliary positioning system.

In this way, the problem of memory consumption caused by configuring a large amount of IP address information of airdrome auxiliary positioning systems in the unmanned aerial vehicle can be avoided.

Alternatively, the cloud scheduling system sends a shutdown instruction to the airdrome auxiliary positioning system of the target airdrome after the unmanned aerial vehicle lands safely, so that the airdrome auxiliary positioning system is turned off to reduce energy consumption.

Figure 4:
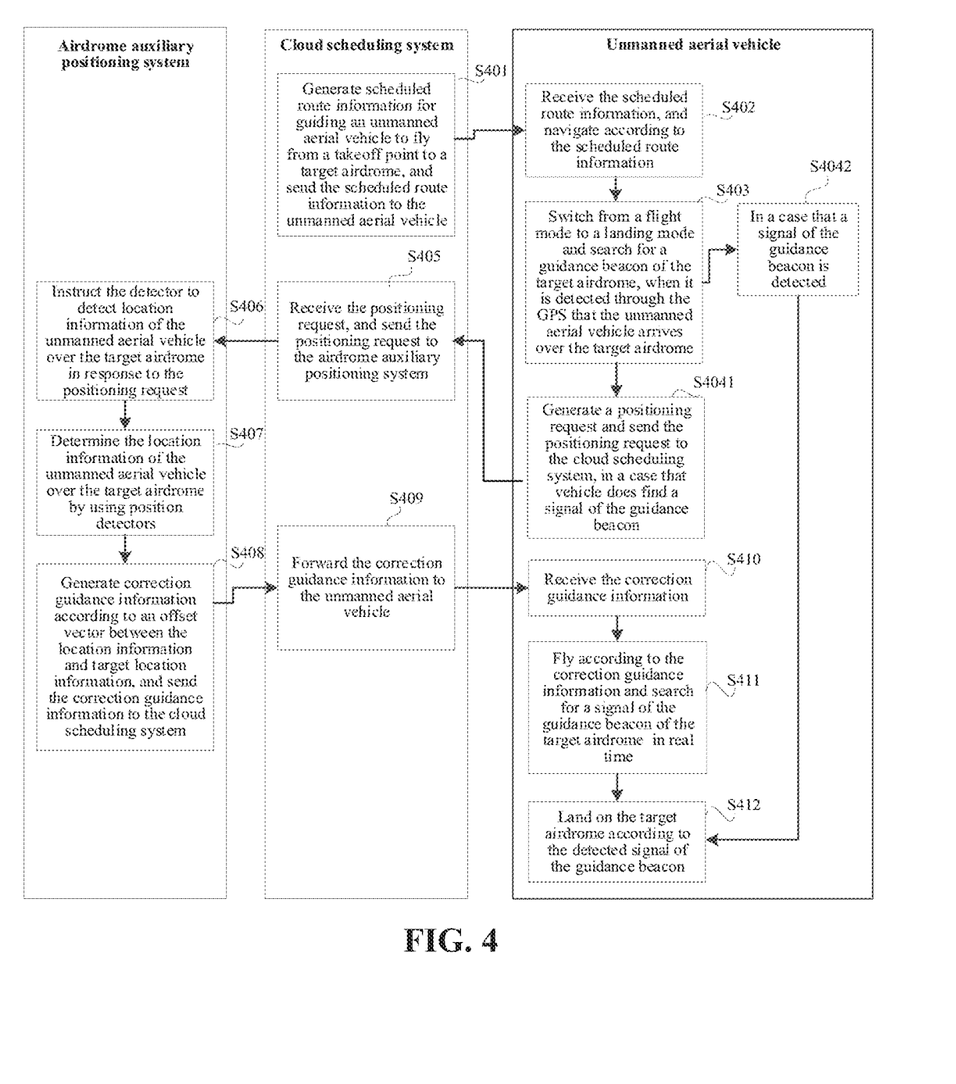
FIG. 4 is a flowchart of another method for guiding landing of an unmanned aerial vehicle according to an embodiment of the present disclosure.

FIG. 4 is a flowchart of another method for guiding landing of an unmanned aerial vehicle according to an embodiment of the present disclosure. As shown in FIG. 4, the method includes the following steps:

S401. A cloud scheduling system generates scheduled route information for guiding an unmanned aerial vehicle to fly from a takeoff point to a target airdrome, and sends the scheduled route information to the unmanned aerial vehicle.

S402. The unmanned aerial vehicle receives the scheduled route information, and navigates according to the scheduled route information.

S403. The unmanned aerial vehicle switches from a flight mode to a landing mode and searches for a signal of a guidance beacon of the target airdrome, when it is detected by a satellite navigation system that the unmanned aerial vehicle arrives over the target airdrome.

S4041. Generate a positioning request and send the positioning request to the cloud scheduling system, in a case that the unmanned aerial vehicle does not find a signal of the guidance beacon.

S4042. Perform S412 in a case that the unmanned aerial vehicle searches for a signal of the guidance beacon;

S405. The cloud scheduling system receives the positioning request, and sends the positioning request to the airdrome auxiliary positioning system.

S406. The airdrome auxiliary positioning system instructs detectors to detect location information of the unmanned aerial vehicle over the target airdrome in response to the positioning request.

S407. Determine the location information of the unmanned aerial vehicle over the target airdrome by using the position detectors.

S408. Generate correction guidance information according to an offset vector between the location information and target location information, and send the correction guidance information to the cloud scheduling system.

S409. The cloud scheduling system forwards the correction guidance information to the unmanned aerial vehicle.

S410. The unmanned aerial vehicle receives the correction guidance information.

S411. The unmanned aerial vehicle flies according to the correction guidance information, and searches for the signal of the guidance beacon of the target airdrome in real time S412. The unmanned aerial vehicle lands on the target airdrome according to the detected signal of the guidance beacon.

Figure 5:
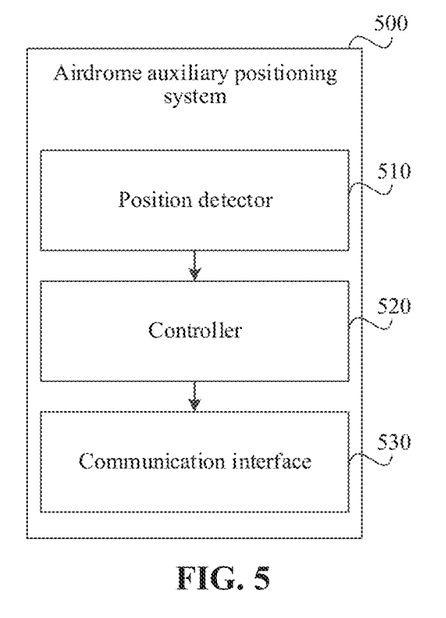
FIG. 5 is a block diagram of an airdrome auxiliary positioning system according to an embodiment of the present disclosure.

An embodiment of the present disclosure further provides an airdrome auxiliary positioning system. As shown in FIG. 5, the airdrome auxiliary positioning system 500 includes:

a position detector 510, configured to determine location information of an unmanned aerial vehicle over a target airdrome;

a controller 520 connected to the position detector, configured to generate correction guidance information according to an offset vector between the location information and target location information, where the target location information is information representing any location within signal coverage of a guidance beacon of the target airdrome; and a communication interface 530 connected to the controller, configured to send the correction guidance information to the unmanned aerial vehicle, where the correction guidance information is used to guide the unmanned aerial vehicle to fly into the signal coverage range of the guidance beacon.

With this apparatus, if the scheduled route information of the unmanned aerial vehicle expires when the unmanned aerial vehicle flies over the target airdrome according to the scheduled route information, the location information of the target airdrome in the scheduled route information may have a GPS data drift. In this case, by using the foregoing technical solution of the disclosure, location information of the unmanned aerial vehicle over the target airdrome is determined by using position detectors in an airdrome auxiliary positioning system of the target airdrome; correction guidance information is generated according to an offset vector between the location information and target location information, where the target location information is information representing any location within signal coverage of a guidance beacon of the target airdrome; and the correction guidance information is sent to the unmanned aerial vehicle, and after the unmanned aerial vehicle flies into the signal coverage of the guidance beacon of the target airdrome according to the correction guidance information, the unmanned aerial vehicle lands according to the guidance beacon, thereby solving the problem in the related art.

Alternatively, the airdrome auxiliary positioning system includes a plurality of the position detectors symmetrically arranged with respect to a center position of the target airdrome. The plurality of position detectors are configured to obtain relative distance information, detected by each of the position detectors, between each of the position detectors and the unmanned aerial vehicle over the target airdrome.

The airdrome auxiliary positioning system 500 further includes a positioner, configured to determine the location information of the unmanned aerial vehicle based on the relative distance information between at least some of the position detectors and the unmanned aerial vehicle.

Alternatively, the plurality of position detectors are configured to control each of the position detectors to detect in a circular range with a location of the target airdrome as a center and a drift distance as a radius, to obtain the relative distance information between each of the position detectors and the unmanned aerial vehicle over the target airdrome.

Alternatively, the communication interface 530 includes a first communication submodule, configured to send the correction guidance information to a cloud scheduling system, so that the cloud scheduling system forwards the correction guidance information to the unmanned aerial vehicle.

Alternatively, the airdrome auxiliary positioning system 500 further includes:
  a turn-on module, configured to determine the location information of the unmanned aerial vehicle over the target airdrome by using the by the position detectors in response to a positioning request sent by the unmanned aerial vehicle, where the positioning request is generated and sent to the airdrome auxiliary positioning system by the unmanned aerial vehicle in a case that no signal of the guidance beacon is detected.

Alternatively, the position detector includes a millimeter wave radar.

Alternatively, the turn-on module further includes a second communication submodule, configured to authenticate the unmanned aerial vehicle by using identity information in the positioning request in response to the positioning request sent by the unmanned aerial vehicle, and establish a communication channel with the unmanned aerial vehicle after the authentication succeeds; and
  the communication interface 530 further includes a third communication submodule, configured to send the correction guidance information to the unmanned aerial vehicle through the communication channel established with the unmanned aerial vehicle.

Alternatively, the correction guidance information is used to guide the unmanned aerial vehicle to center lines between different position detectors in sequence, so that the unmanned aerial vehicle flies into the signal coverage of the guidance beacon.

Figure 6:
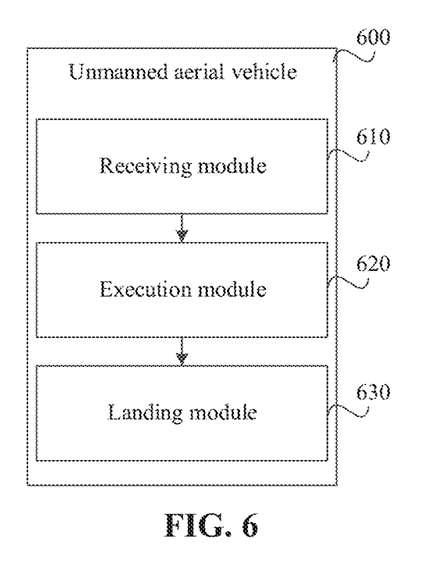
FIG. 6 is a block diagram of an unmanned aerial vehicle according to an embodiment of the present disclosure.

FIG. 6 is a block diagram of an unmanned aerial vehicle according to an embodiment of the present disclosure. As shown in FIG. 6, the unmanned aerial vehicle 600 includes:
  a receiving module 610, configured to receive correction guidance information, where the correction guidance information is generated by an airdrome auxiliary positioning system of a target airdrome;
  an execution module 620, configured to fly into signal coverage of a guidance beacon of the target airdrome according to the correction guidance information; and
  a landing module 630, configured to land on the target airdrome according to the guidance beacon.

With this unmanned aerial vehicle, if the unmanned aerial vehicle cannot detect a signal of the guidance beacon of the target airdrome when flying over a target airdrome location indicated in the scheduled route information, it means that the scheduled route information of the unmanned aerial vehicle has expired. As a result, a GPS data drift occurs in the location information of the target airdrome. In this case, the unmanned aerial vehicle receives the correction guidance information generated by the airdrome auxiliary positioning system of the target airdrome, and flies into the signal coverage of the guidance beacon of the target airdrome according to the correction guidance information; and further, after the unmanned aerial vehicle flies to the signal coverage of the guidance beacon of the target airdrome, the unmanned aerial vehicle can accurately and safely land on the target airdrome according to the detected guidance beacon.

In some embodiments, the unmanned aerial vehicle 600 further includes:
  a switching module, configured to switch from a flight mode to a landing mode and search for the guidance beacon of the target airdrome, when it is detected by a satellite navigation system that the unmanned aerial vehicle arrives over the target airdrome; and
  a sending module, configured to generate a positioning request and send the positioning request to the airdrome auxiliary positioning system of the target airdrome, in a case that the unmanned aerial vehicle does not find a signal of the guidance beacon.

In some embodiments, the sending module includes:
  a sending submodule, configured to send the positioning request to the cloud scheduling system, so that the cloud scheduling system sends the positioning request to the airdrome auxiliary positioning system.

The present disclosure further provides a system for guiding landing of an unmanned aerial vehicle, including the foregoing airdrome auxiliary positioning system 500 and the foregoing unmanned aerial vehicle 600.

The present disclosure further provides a system for guiding landing of an unmanned aerial vehicle, including the foregoing airdrome auxiliary positioning system 500 and an unmanned aerial vehicle, where the unmanned aerial vehicle is configured to implement the method for guiding landing of an unmanned aerial vehicle corresponding to FIG. 3.

The disclosure further provides an unmanned aerial vehicle, including a processor and a memory for storing instructions executable by the processor, where the instructions, when executed by the processor is executed, implement the foregoing method for guiding landing of an unmanned aerial vehicle, such as the method for guiding landing of an unmanned aerial vehicle corresponding to FIG. 3.

With respect to the apparatus in the foregoing embodiment, manners of performing operations by the modules have been described in detail in the embodiments related to the method, and are not described in detail herein.

The preferred implementations of the disclosure are described in detail above with reference to the accompanying drawings, but the disclosure is not limited to the details in the above implementations. Various simple variations may be made to the technical solutions of the disclosure within the scope of the technical idea of the disclosure, and such simple variations shall all fall within the protection scope of the disclosure.

It should be additionally noted that, technical features described in the foregoing specific implementations may be combined in any appropriate manner without conflict. To avoid unnecessary repetition, various possible combinations are not further described in the disclosure.

In addition, different implementations of the disclosure may also be arbitrarily combined without departing from the idea of the disclosure, and these combinations shall still be regarded as content disclosed in the disclosure.

What is claimed is:

1. A method for guiding landing of an unmanned aerial vehicle, comprising:
    determining location information of the unmanned aerial vehicle over a target airdrome by using a plurality of position detectors in an airdrome auxiliary positioning system;
    generating, by a controller in the airdrome auxiliary positioning system, correction guidance information according to an offset vector between the location information and target location information, wherein the target location information is information representing any location within signal coverage of a guidance beacon of the target airdrome; and
    performing positioning for the unmanned aerial vehicle, in response to that a signal of the guidance beacon of the target airdrome is not detected by the unmanned aerial vehicle, by sending, via a communication interface in airdrome auxiliary positioning system, the correction guidance information to the unmanned aerial vehicle, wherein the correction guidance information is configured to guide the unmanned aerial vehicle to fly into the signal coverage of the guidance beacon;
    wherein the plurality of the position detectors are placed in positions to be capable of creating a detection range larger than the signal coverage of the guidance beacon of the target airdrome.

2. The method according to claim 1, wherein the airdrome auxiliary positioning system comprises a plurality of the position detectors symmetrically arranged with respect to a center position of the target airdrome;
    the determining location information of the unmanned aerial vehicle over a target airdrome by using a plurality of position detectors in an airdrome auxiliary positioning system comprises:
    obtaining relative distance information, detected by each of the position detectors, between each of the position detectors and the unmanned aerial vehicle over the target airdrome; and
    determining the location information of the unmanned aerial vehicle according to the relative distance information between at least some of the position detectors and the unmanned aerial vehicle.

3. The method according to claim 2, wherein the obtaining relative distance information, detected by each of the position detectors, between each of the position detectors and the unmanned aerial vehicle over the target airdrome comprises:
    controlling each of the position detectors to detect in a circular range with a location of the target airdrome as a center and a drift distance as a radius, to obtain the relative distance information between each of the position detectors and the unmanned aerial vehicle over the target airdrome.

4. The method according to claim 1, wherein the determining location information of the unmanned aerial vehicle over a target airdrome by using a plurality of position detectors in an airdrome auxiliary positioning system comprises:
    determining the location information of the unmanned aerial vehicle over the target airdrome by using the plurality of position detectors in response to a positioning request sent by the unmanned aerial vehicle.

5. The method according to claim 4, wherein
    the determining the location information of the unmanned aerial vehicle over the target airdrome by using the plurality of position detectors in response to a positioning request sent by the unmanned aerial vehicle comprises:
    authenticating the unmanned aerial vehicle by using identity information in the positioning request when receiving the positioning request sent by the unmanned aerial vehicle;
    establishing a communication channel with the unmanned aerial vehicle after the authentication succeeds; and
    the sending the correction guidance information to the unmanned aerial vehicle comprises:
    sending the correction guidance information to the unmanned aerial vehicle through the communication channel established with the unmanned aerial vehicle.

6. The method according to claim 1, wherein the sending the correction guidance information to the unmanned aerial vehicle comprises:
    sending the corrected guidance information to a cloud scheduling system, so that the cloud scheduling system forwards the corrected guidance information to the unmanned aerial vehicle.

7. The method according to claim 1, wherein the plurality of position detectors comprises a first position detector and a second position detector, and are symmetrically arranged with respect to a center position of the target airdrome, the correction guidance information is configured to guide the unmanned aerial vehicle to center lines between different position detectors in sequence, so that the unmanned aerial vehicle flies into the signal coverage of the guidance beacon, wherein the center line is a straight line passing through a midpoint of a line segment connecting positions of the first position detector and the second position detector, and being perpendicular to the line segment.

8. A method for guiding landing of an unmanned aerial vehicle, applied to the unmanned aerial vehicle and comprising:
    receiving correction the guidance information, wherein correction guidance information is generated by an airdrome auxiliary positioning system of a target airdrome;
    flying into signal coverage of a guidance beacon of the target airdrome according to the correction guidance information; and
    landing to the target airdrome according to the guidance beacon;
    wherein a plurality of position detectors of the airdrome auxiliary positioning system are placed in positions to be capable of creating a detection range larger than the signal coverage of the guidance beacon of the target airdrome and is configured to determine location information of the unmanned aerial vehicle; and wherein the correction guidance information is generated according to an offset vector between the location information and target location information, and is configured to guide the unmanned aerial vehicle to fly into the signal coverage of the guidance beacon, and wherein the target location information is information representing any location within signal coverage of a guidance beacon of the target airdrome.

9. The method according to claim 8, wherein before the receiving correction guidance information, the method comprises:

switching from a flight mode to a landing mode and searching for the guidance beacon of the target airdrome, when it is detected by a satellite navigation system that the unmanned aerial vehicle arrives over the target airdrome; and generating a positioning request and sending the positioning request to the airdrome auxiliary positioning system of the target airdrome, in a case that the unmanned aerial vehicle does not find a signal of the guidance beacon.

10. The method according to claim 9, wherein the sending the positioning request to the airdrome auxiliary positioning system of the target airdrome comprises:

sending the positioning request to a cloud scheduling system, so that the cloud scheduling system sends the positioning request to the airdrome auxiliary positioning system.

11. The method according to claim 9, wherein after the unmanned aerial vehicle lands, the method further comprises:

sending a shutdown instruction to the airdrome auxiliary positioning system of the target airdrome through a cloud scheduling system, so that the cloud scheduling system sends the shutdown instruction to instruct the airdrome auxiliary positioning system to turn off.

12. An airdrome auxiliary positioning system, comprising:

a position detector, configured to determine location information of an unmanned aerial vehicle over a target airdrome, wherein the position detector is placed in positions to be capable of creating a detection range larger than a signal coverage of a guidance beacon of the target airdrome;

a controller connected to the position detector, configured to generate correction guidance information according to an offset vector between the location information and target location information, wherein the target location information is information representing any location within signal coverage of a guidance beacon of the target airdrome; and a communication interface connected to the controller, configured to send the correction guidance information to the unmanned aerial vehicle, wherein the correction guidance information is configured to guide the unmanned aerial vehicle to fly into the signal coverage of the guidance beacon;

wherein the plurality of the position detectors are placed in positions to be capable of creating a detection range larger than the signal coverage of the guidance beacon of the target airdrome.

13. The airdrome auxiliary positioning system according to claim 12, wherein a plurality of position detectors are provided and symmetrically arranged with respect to a center position of the target airdrome.

\* \* \* \* \*

UNITED STATES PATENT AND TRADEMARK OFFICE
CERTIFICATE OF CORRECTION

PATENT NO. : 12,307,913 B2
APPLICATION NO. : 18/054467
DATED : May 20, 2025
INVENTOR(S) : Jinjin Wang Page 1 of 1

It is certified that error appears in the above-identified patent and that said Letters Patent is hereby corrected as shown below:

In the Claims

Claim 8, Column 16, Lines 55 - 56, the text "receiving correction the guidance information, wherein correction guidance information" should read --receiving correction guidance information, wherein the correction guidance information--.

Signed and Sealed this
Fifth Day of August, 2025

Coke Morgan Stewart
*Acting Director of the United States Patent and Trademark Office*